United States Patent [19]
Henseler et al.

[11] Patent Number: 5,135,255
[45] Date of Patent: Aug. 4, 1992

[54] RECEPTACLE ARRANGEMENT FOR AN AIR BAG

[75] Inventors: Wolfgang Henseler, Tübingen; Manfred Müller, Deizisau; Egon Katz, Nagold; Guido Wetzel, Sindelfingen; Luigi Brambilla, Böblingen, all of Fed. Rep. of Germany

[73] Assignee: Mercedes-Benz AG, Fed. Rep. of Germany

[21] Appl. No.: 680,571

[22] Filed: Apr. 4, 1991

[30] Foreign Application Priority Data

Apr. 4, 1990 [DE] Fed. Rep. of Germany ....... 4010766

[51] Int. Cl.$^5$ .............................................. B60R 21/20
[52] U.S. Cl. ................................... 280/743; 280/731; 220/266
[58] Field of Search ............... 280/730, 731, 743, 732, 280/733; 220/266

[56] References Cited

U.S. PATENT DOCUMENTS

| | | | |
|---|---|---|---|
| 3,622,176 | 11/1971 | Byer | 280/731 |
| 3,794,349 | 2/1974 | Fuller | 280/743 |
| 4,148,503 | 4/1979 | Shiratori et al. | 280/731 |
| 4,903,986 | 2/1990 | Cok et al. | 280/743 |
| 5,013,064 | 5/1991 | Miller et al. | 280/731 |

FOREIGN PATENT DOCUMENTS 2905618 8/1980 Fed. Rep. of Germany.

Primary Examiner—Robert P. Olszewski
Assistant Examiner—Kenneth Noland
Attorney, Agent, or Firm—Evenson, Wands, Edwards, Lenahan & McKeown

[57] ABSTRACT

A receptacle arrangement for an air bag which protects a vehicle occupant from an impact onto parts of the vehicle interior, has a covering which is fixed to a base plate and covers an air bag container. The covering folds out along a hinge axis of a hinge in the edge region of the air bag container during the unfolding of the air bag, after which it exposes a container aperture for the passage of the bag fabric into an inflated position in front of the vehicle occupant. The covering has, in addition to the first hinge, two further hinges which bound the first hinge on both sides, are approximately perpendicular thereto and have a clearance from the lateral edges of the covering. Thereby, two lateral covering flaps are formed which subdivide the swivellable covering.

20 Claims, 2 Drawing Sheets

RECEPTACLE ARRANGEMENT FOR AN AIR BAG

BACKGROUND AND SUMMARY OF THE INVENTION

The present invention relates to a receptacle arrangement for an air bag, and, more particularly, to an arrangement in which lateral covering flaps and subsequently the entire covering can be swivelled back from the container aperture about a bottom transverse hinge.

U.S. Pat. No. 3,794,349 describes a covering for an air bag which is fixed to a base plate of an instrument panel and covers an air bag container. By virtue of a slot-type notching in the covering profile, the covering has in a lower edge region a transverse hinge, about which the covering can be folded back against the vehicle floor during the unfolding of the air bag. The air bag, which is inflated by a gas generator in fractions of a second, presses against the inside of the covering with great force, by which the covering is burst open and the air bag fabric emerges at great speed in the direction of a vehicle occupant.

An underlying object of the present invention is to reduce the momentum of an air bag when it is unfolding from a covering in the direction of a vehicle occupant.

The object has been achieved by a receptacle arrangement for an air bag which protects a vehicle occupant from an impact onto parts of the vehicle interior, having a rectangular covering. The long rectangular sides of the covering are aligned in the transverse direction of the vehicle in straight-ahead travel, and which, fixed to a base plate, covers an air bag container and folds out along a transverse hinge axis of a hinge in the lower edge region of the air bag container during the unfolding of the air bag, after which it completely exposes a container aperture above the edge region for the passage of the bag fabric into an inflated position in front of the vehicle occupant. The covering has, in addition to the first bottom transverse hinge, two further hinges which bound the first hinge on both sides, are approximately perpendicular thereto and have a clearance from the lateral edges of the covering. Thereby two lateral covering flaps are formed which subdivide the swivellable covering, and firstly the lateral covering flaps and subsequently the entire covering can be swivelled back from the container aperture about the bottom transverse hinge due to a loading of the inside of the covering by the unfolding air bag.

During the unfolding of the air bag the lateral covering flaps of the covering open from the lateral regions of the air bag container first, which means that the air bag has already attained a certain filling volume before the entire covering folds back from the container aperture. Thus, the movement of the air bag in the central region is retarded in relation to the side regions. The unfolding momentum of the very rapidly unfolding air bag is thereby diminished in the central region of the air bag.

This opening mechanism can not only be controlled by the method of folding the air bag into the air bag container, but also by controlling a sequence of this type by providing additional control-related connections of the covering to the triggering mechanism of the gas generator. The predetermined break edges around the lateral covering flaps can be machined deeper into the covering material than the predetermined break edge which, as the last one, releases a swivel movement of the complete covering, and/or the hinges of the swivellable covering and the two lateral covering flaps are provided such that the covering, which can be swivelled back last, has in the hinge a higher resistance to the opening movement than the hinges of the lateral covering flaps. This resistance can be influenced by an insert strip attached to the inside of the covering.

If the air bag container with the fold-out covering is fixed in a steering wheel, it is advantageous to arrange it in such a way that it does not project over the steering wheel hub after the air bag has unfolded.

BRIEF DESCRIPTION OF THE DRAWINGS

These and other objects, features and advantages of the present invention will become more apparent from the following detailed description of a presently preferred embodiment when taken in conjunction with the accompanying drawings, wherein.

DETAILED DESCRIPTION OF THE DRAWINGS

Figure 1:
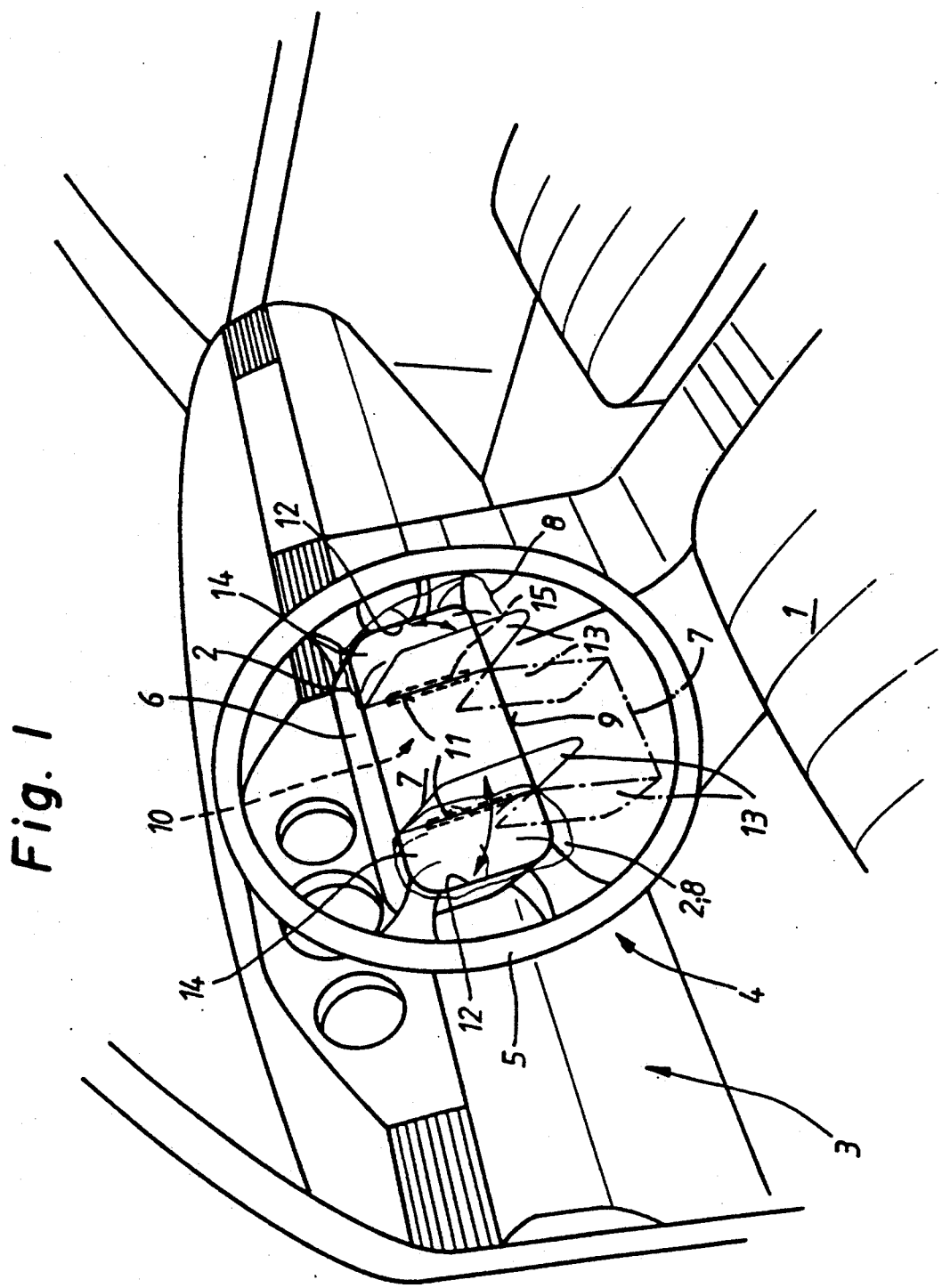
FIG. 1 is a perspective view of a portion of the interior of a motor vehicle having an air bag container arranged in a steering wheel, with the covering of air bag container having lateral covering flaps opened (drawn in thin lines) and completely folded back from the container aperture (drawn in dot-dashed lines)

In a motor vehicle, a vehicle occupant (not illustrated), who could be sitting on a seat 1, is to be protected from an impact onto parts 3 of the vehicle interior and, in particular, onto a steering wheel 4 with a steering wheel rim 5 in an accident involving the vehicle by a unfolding air bag 2.

The air bag 2 is folded and is placed inside an air bag container 6 which is fixed on a steering wheel hub within the steering wheel rim 5. This receptacle arrangement for the air bag 2 comprises a flat covering 7 which is fixed to a base plate, which is formed in this case by the air bag container 6 itself and which covers the air bag container 6 above the folded-in air bag 2.

During the unfolding of the air bag 2 by a gas generator 1 (not illustrated in detail) at the bottom of the air bag container 6, through which gas flows into the bag fabric 8, the covering 7 is folded out along a hinge axis of a hinge 9 in the lower edge region, after which is a container aperture 10 is exposed for the passage of the bag fabric 8 into an inflated position in front of the vehicle occupant. In addition to the first hinge 9, the covering 7 has two further hinges 11 which are approximately perpendicular to the first hinge 9 and have a clearance from the lateral edges 12 of the covering 7, via which two lateral covering flaps 13 are formed which subdivide the swivellable covering 7. The hinge 9 of the covering 7 is bounded by these two covering flaps 13.

Figure 2:
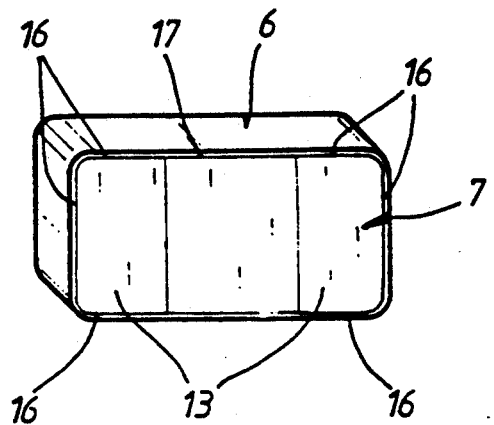
FIGS. 2–4 are additional perspective views of the air bag container of FIG. 1 having respectively a closed covering, the covering flaps opened laterally and the covering completely opened, (drawn in each case without the air bag).
Figure 3:
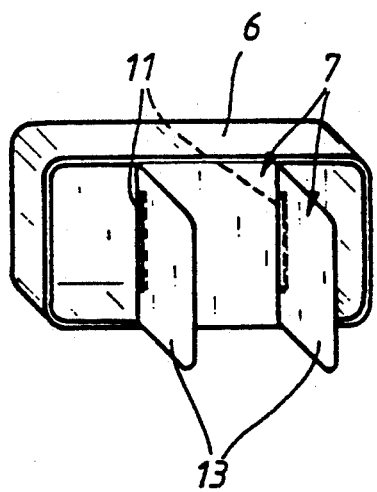
Figure 4:
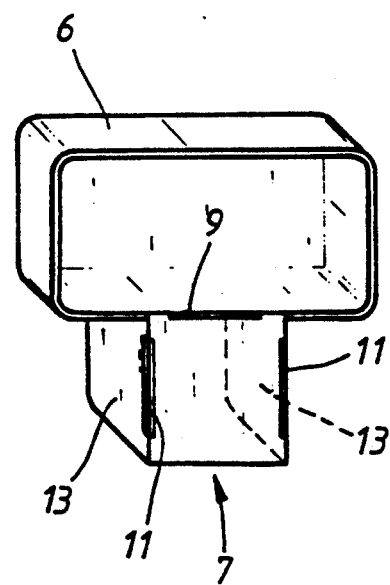

An unfolding sequence of the air bag 2 is controlled by these covering flaps 13. During the unfolding sequence a plurality of folded layers of the air bag 2 are unfolded firstly only in lateral regions 14 and emerge partially from the air bag container 6, and only then is the covering 7 swivelled back completely from the container aperture 10 by the pressure of the air bag 2 on the inside of the covering. This opening operation of the covering is drawn sequentially in FIGS. 2–4. Due to the fact that the central region of the air bag 2 can thus be unfolded only in a delayed manner in relation to its lateral regions and can be filled in front of the vehicle occupant, the unfolding momentum in the central region of the air bag has a reduced effect in the direction of the vehicle occupant.

The lateral covering flaps 13 are opened along their predetermined break edges 16 due to the loading of the inside of the covering by the unfolding air bag 2. The predetermined break edges 16 have a lower resistance to breaking than the transverse predetermined break edge 17. The opening forces of the predetermined break edges 16, 17 can be varied and adapted, for example, in a simple manner by different notching depths on the inside or outside of the covering. In addition, the opening mechanism can be influenced by the construction of the hinges 9, 11 themselves which, for example, have a certain notching depth on the inside of the covering profile, or contain insert strips 15, made for example, of fabric, aluminum or steel. The strips 15 can bridge the hinges 9, 11 along their longitudinal axis and can thereby strengthen the hinges and thereby also increase the resistance to folding out, by which the opening speed of the flaps 7 and 13 can be varied. These insert strips 15 can also be molded into the covering material so that the flaps break open along their intended hinge axis, are held by the insert strip 15 on the air bag container 6 and can be influenced in the speed of their folding-out movement by the insert strips 15.

In order not to have any parts projecting over the steering wheel 4 after the covering 7 has been folded back from the container aperture 10, the covering 7 is arranged in such a way that it lies within the steering wheel rim 5 in the folded-back opened position.

Although the invention has been described and illustrated in detail, it is to be clearly understood that the same is by way of illustration and example, and is not to be taken by way of limitation. The spirit and scope of the present invention ar to be limited only by the terms of the appended claims.

What is claimed:

1. A receptacle arrangement for an air bag adapted to protect a vehicle occupant from an impact onto interior parts of the vehicle, comprising a rectangular covering fixed to the base plate, the long rectangular sides of the covering being aligned in a transverse direction of the vehicle in straight-ahead travel and which covers an air bag container and folds out along a transverse hinge axis of a hinge in a lower edge region of the air bag container during unfolding of the air bag, after which it completely exposes a container aperture above said edge region for the passage of the bag fabric into an inflated position in front of the vehicle occupant, wherein the covering is swivellable and has, in addition to the first bottom transverse hinge, two additional hinges which laterally bound said first hinge, are approximately perpendicular thereto and have a clearance from the lateral edges of the covering, by which two lateral covering flaps are formed which subdivide the swivellable covering.

2. The receptacle arrangement according to claim 1, wherein firstly the lateral covering flaps and subsequently the entire covering can be swivelled back from the container aperture about the bottom transverse hinge due to a loading of the inside of the covering by the unfolding air bag 3. The receptacle arrangement according to claim 2, wherein a higher resistance to folding out is provided by the first hinge of the covering than by the two additional hinges of the covering flaps.

4. The receptacle arrangement according to claim 1, wherein at least one of the hinges is formed by linear notchings in a profile of the covering.

5. The receptacle arrangement according to claim 4, wherein firstly the lateral covering flaps and subsequently the entire covering can be swivelled back from the container aperture about the bottom transverse hinge due to a loading of the inside of the covering by the unfolding air bag.

6. The receptacle arrangement according to claim 5, wherein a higher resistance to folding out is provided by the first hinge of the covering than by the two additional hinges of the covering flaps.

7. The receptacle arrangement according to claim 1, wherein at least one of the hinges is strengthened by insert strips attached to the inside of the covering.

8. The receptacle arrangement according to claim 7, wherein firstly the lateral covering flaps and subsequently the entire covering can be swivelled back from the container aperture about the bottom transverse hinge due to a loading of the inside of the covering by the unfolding air bag.

9. The receptacle arrangement according to claim 8, wherein a higher resistance to folding out is provided by the first hinge of the covering than by the two additional hinges (11) of the covering flaps.

10. The receptacle arrangement according to claim 7, wherein at least one of the hinges is formed by linear notchings in a profile of the covering.

11. The receptacle arrangement according to claim 7, wherein the insert strip is configured to influence the opening speed of an associated flap.

12. The receptacle arrangement according to claim 11, wherein firstly the lateral covering flaps and subsequently the entire covering can be swivelled back from the container aperture about the bottom transverse hinge due to a loading of the inside of the covering by the unfolding air bag.

13. The receptacle arrangement according to claim 12, wherein a higher resistance to folding out is provided by the first hinge of the covering than by the two additional hinges of the covering flaps.

14. The receptacle arrangement according to claim 11, wherein at least one of the hinges is formed by linear notchings in a profile of the covering.

15. The receptacle arrangement according to claim 1, wherein the air bag container is arranged in a steering wheel in such that the covering, in the folded-back opened position, lies within a steering wheel rim.

16. The receptacle arrangement according to claim 15, wherein firstly the lateral covering flaps and subsequently the entire covering can be swivelled back from the container aperture about the bottom transverse hinge due to a loading of the inside of the covering by the unfolding air bag.

17. The receptacle arrangement according to claim 16, wherein a higher resistance to folding out is provided by the first hinge of the covering than by the two additional hinges of the covering flaps.

18. The receptacle arrangement according to claim 15 wherein at least one of the hinges is formed by linear notchings in a profile of the covering.

19. The receptacle arrangement according to claim 15, wherein at least one of the hinges is strengthened by insert strips attached to the inside of the covering.

20. The receptacle arrangement according to claim 19, wherein the insert strip is configured to influence the opening speed of an associated flap.

* * * * *